United States Patent [19]

Huff et al.

[11] Patent Number: 4,663,517

[45] Date of Patent: May 5, 1987

[54] ELECTRIC BARBEQUE COOKER

[75] Inventors: George L. Huff, Greeneville; Emmett R. Bales, Morristown, both of Tenn.

[73] Assignee: MECO Corporation, Greenville, Tenn.

[21] Appl. No.: 764,432

[22] Filed: Aug. 9, 1985

[51] Int. Cl.[4] .......................... A21B 1/00; A21B 1/22; F27D 11/00

[52] U.S. Cl. .................... 219/404; 219/443; 219/461; 219/521; 99/393; 99/390

[58] Field of Search ............... 219/386, 400, 404, 443, 219/461, 521, 538, 385, 387, 405; 99/377, 385, 401, 393, 450, 390, 447

[56] References Cited

U.S. PATENT DOCUMENTS

| | | | |
|---|---|---|---|
| D. 265,162 | 6/1982 | Bales | D7/110 |
| 3,757,671 | 9/1973 | Warshaver et al. | 99/401 |
| 3,789,748 | 2/1974 | Rappoport et al. | 99/401 |
| 4,089,258 | 5/1978 | Berger | 99/339 |

OTHER PUBLICATIONS

Article form the magazine entitled "Appliance Manufacturer", Jul., 1985, issue on More Pizazz for Gas.
Copy of Brochure from Ducane Heating Corporation, 800 Dutch Square Blvd., Columbia, S.C. 29210 on their Sportsline '78 barbecue and char-cook grills.

Primary Examiner—E. A. Goldberg
Assistant Examiner—Lincoln D. Donovan
Attorney, Agent, or Firm—Luedeka & Neely

[57] ABSTRACT

An electric barbeque cooker has an electric heating unit dimensioned to fit within a cooker bowl. The heating unit is connected to a power supply and it is mounted within the bowl for movement between a horizontal position and an a nonhorizontal position. In the preferred embodiment, the heat unit may be rotated to a vertical position adjacent to the rear wall of the cooker bowl which is dimensioned to contain said heating element within the volume of the bowl even when the element is in the vertical position. A handle is rotatably mounted on the exterior of the bowl and it is mechanically interconnected with the heating element so that the element may be rotated by pivotally moving the handle. A catch mechanism selectively holds the heating unit in at least two positions but, preferably, the unit may be held in a horizontal position, a slightly inclined position and a vertical position. The heating unit is controlled by a thermostat that is mounted in a housing mounted on the exterior of the bowl. Preferably, the housing will rotate in unison with the heating unit.

23 Claims, 13 Drawing Figures

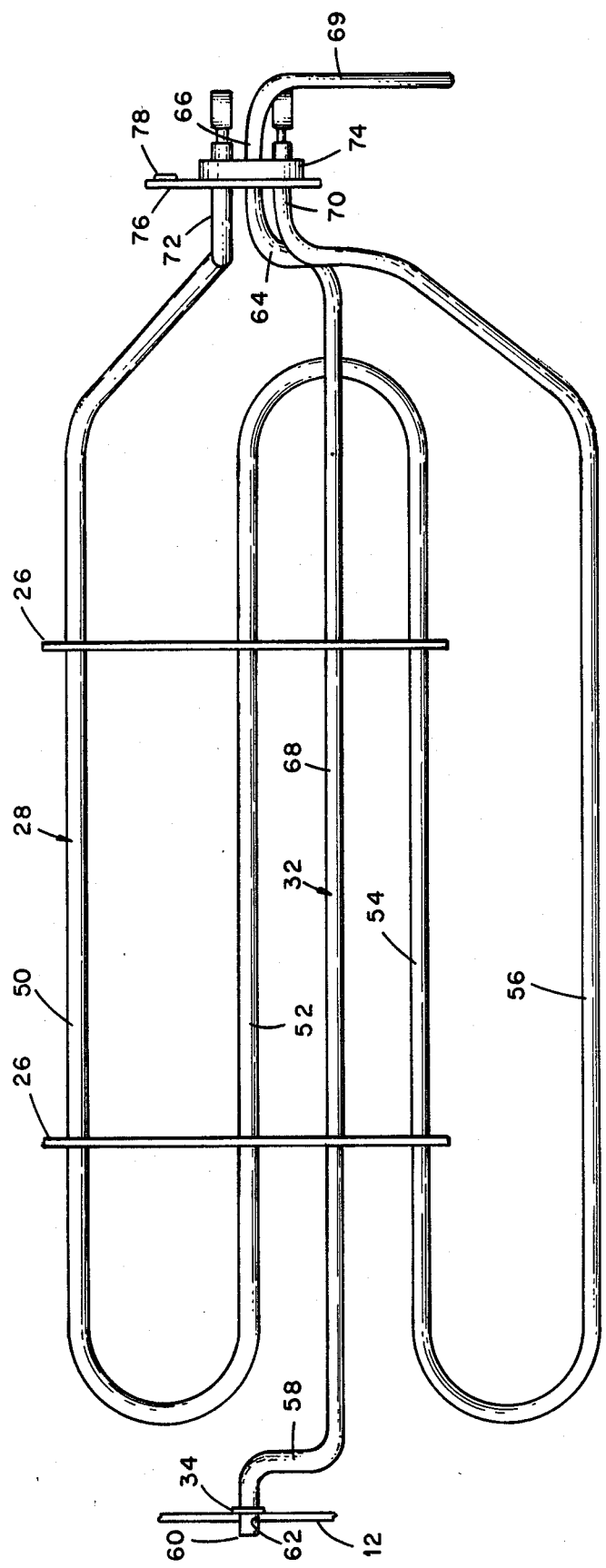

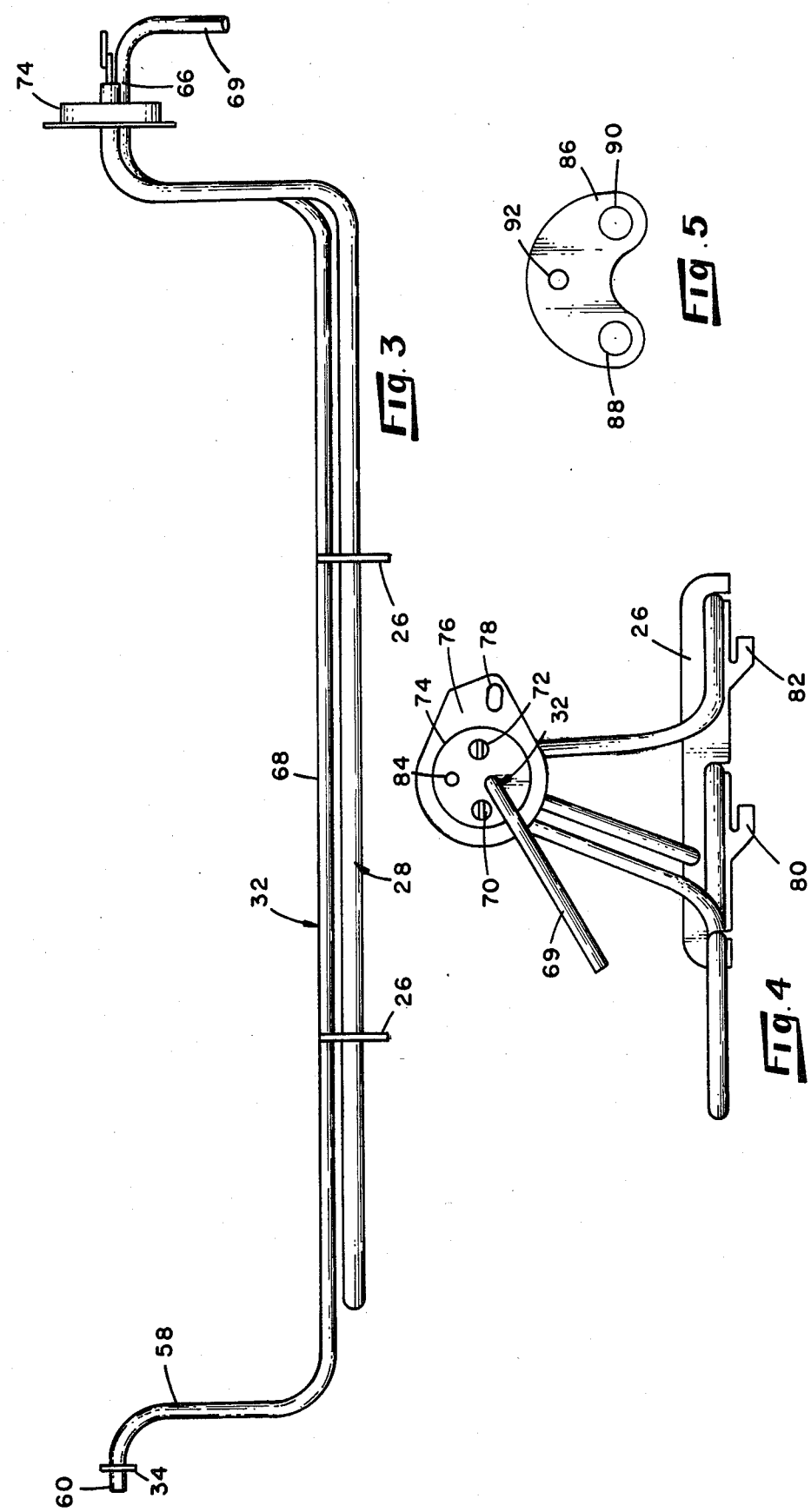

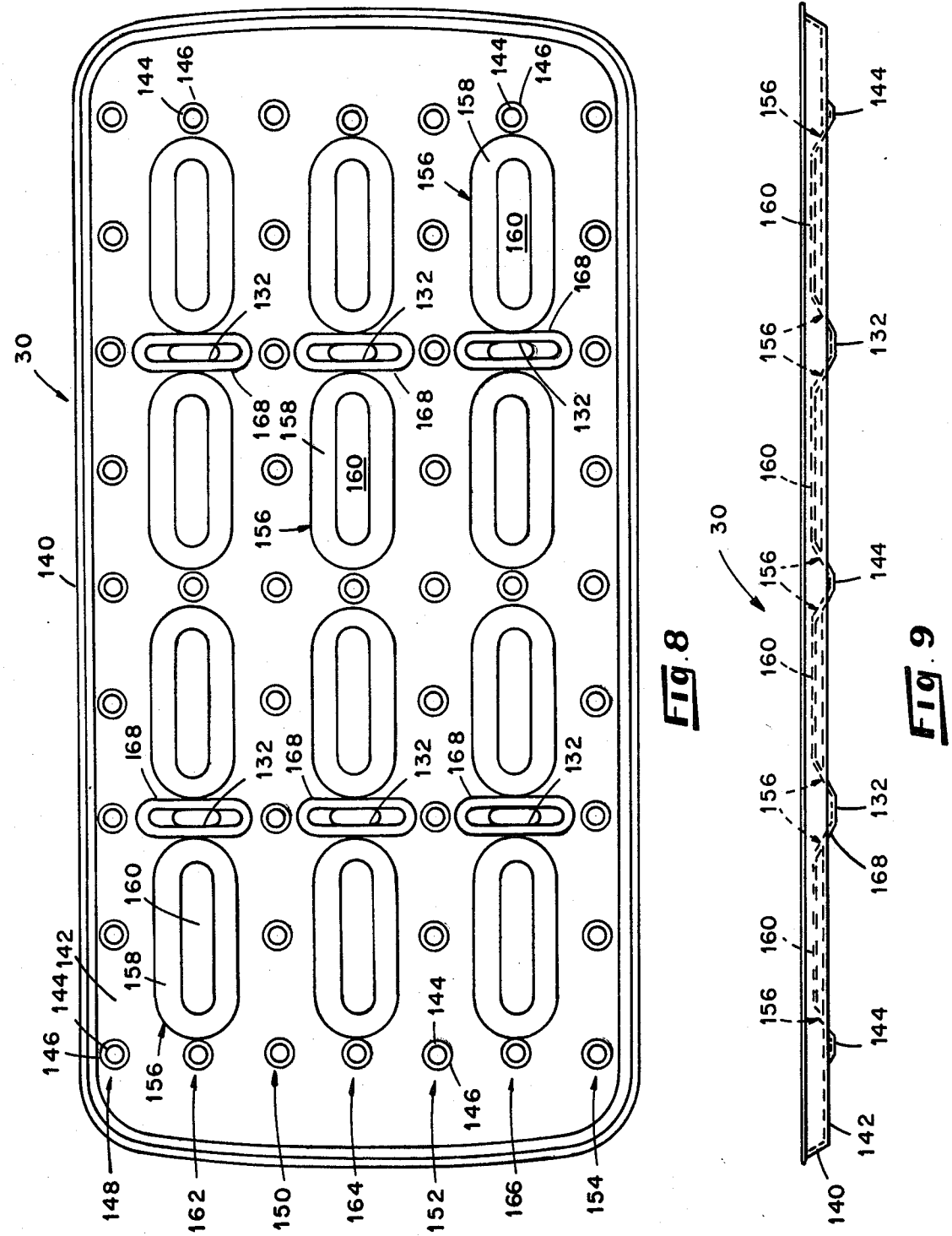

ELECTRIC BARBEQUE COOKER

FIELD OF INVENTION

The present invention relates to barbeque grills or cookers and particularly relates to a barbeque cooker having a heating unit that is movable between a horizontal position, and inclined position, and a vertical position.

BACKGROUND AND SUMMARY OF THE INVENTION

Barbeque grills or cookers are popular for outdoor cooking and part of their popularity is due to the "outdoor taste" achieved by cooking on a barbeque grill. This "outdoor taste" is widely thought to be the result of cooking on charcoal. However, the "outdoor taste" can also be achieved on an electric grill by allowing the drippings from the meat to ignite and create flame and smoke. It is actually the burning of grease drippings that creates the "outdoor taste".

Some electric cooking grills are lined at the bottom with rocks, and the heating element is disposed immediately above the rocks. In this construction, the grease and other drippings from the food being cooked will strike the rocks, and because of their proximity to the heating element, the grease on the rocks will ignite creating flame and smoke to provide the "outdoor taste" for the meat. The problem with this type of grill is that the rocks are heavy and bulky and this system is susceptible to an unacceptable amount of flaming or flareup. The grease may accumulate in or on the rocks and, when the grease ignites, a sufficient flame will be created to burn the food.

The electric grill using rocks or similar material is attempting to emulate a charcoal grill in both appearance and function. However, it is also achieving all of the disadvantages of the charcoal grill and it is not taking full advantage of an electric heating element. The present invention does not attempt to emulate the charcoal appearance and, therefore, does not provide the heavy, bulky rocks.

In accordance with the present invention, an electric barbeque cooker includes a cooker bowl and a heating element dimensioned to fit within the bowl. Electric power is supplied to the heating element and it is mounted within the bowl for movement between a substantially horizontal position and a nonhorizontal position. In the preferred embodiment, the heating element may be rotated between a horizontal position, an inclined position, and at least one substantially vertical position. The bowl is dimensioned to contain the heating element when it is in both the horizontal and vertical positions.

An actuation mechanism is connected to the heating element for moving it between its various positions and a catch mechanism selectively holds the heating element in the selected position. In the preferred embodiment, the actuation mechanism is an adjusting rod that is operable to move the heating element within the bowl and is connected to a handle on the exterior of the bowl. By pivotally moving the handle on the exterior of the bowl, the adjusting rod moves the heating element to the desired position.

In order to achieve the desired heating and flame conditions, the present invention utilizes a reflector immediately beneath the heating element when it is in the horizontal position. In this construction, grease drippings from the food on a grill will fall on the heating element and on the reflector. Holes are provided in the reflector to drain off excess grease, and drippings that fall on a heating element or on the reflector near the heating element will ignite creating a flame and smoke.

In the preferred embodiment, a bracket is secured to the adjusting rod and both the heating element and the reflector are secured to the bracket. The bracket is designed with hooks that fit into apertures on the reflector in such a manner that the reflector may be easily removed from the bracket for washing. Preferably, the hooks will face upwardly when the reflector is in the vertical position and the reflector may be removed from the bracket by simply pulling it upwardly when it is in the vertical position.

The electrical connections for the heating element are provided in a housing that defines an enclosed space and portions of the heating elements are within the housing so that the heating element is operable to heat the interior of the housing. A power cord supplies power to the enclosed space within the housing, and a thermostat is mounted in the housing for being connected between the power cord and the heating element. The thermostat switches the power "on" and "off" to the heating unit in response to the temperature within the enclosed space of the housing. Since the heating element is providing heat for the interior of the housing, the thermostat is acting in response to the heat generated by the heating element. A knob on the housing is connected to the thermostat for adjusting the temperature at which the thermostat will switch "on" and "off".

Again, in the preferred embodiment, the handle that is used to adjust the position of the adjusting rod extends from and is part of the housing. The adjusting rod is bent and configured to extend from within the handle, through the housing, through the side of the bowl and across the bowl. By placing a portion of the adjusting rod in the handle itself, the adjusting rod may be rotated using the handle with very little stress being applied to the housing itself.

It will be appreciated that the above construction provides a versatile grill in which meat may be cooked on a grill above a horizontal heating element or on a rotisserie with the heating element positioned vertically along the rear wall of the cooker bowl. A vertical heating element virtually eliminates the possibility of a flareup sufficient to burn the meat because the drippings fall on the relatively cool bottom of the cooker bowl, rather than on the heating element or reflector. It will also be appreciated that by providing a thermostat and all of the electrical connections in a housing that rotates with the heating element, there is no need for any flexing or sliding electrical contacts in order to provide an electrical connection between the thermostat and the heating element.

BRIEF DESCRIPTION OF THE DRAWINGS

The above described advantages and other advantages of the present cooker will become readily apparent to those of ordinary skill in the art by reference to the Detailed Description of a preferred embodiment when considered in conjunction with the Drawings, in which:

FIGS. 2, 3 and 4 are, respectively, a plan view, a side view and an end view of the heating element, adjusting rod and support bracket;

FIG. 5 is a detail view of a bracket used for mounting the heating element;

FIGS. 8 and 9 are, respectively, a plan view and a side view of the reflector of the present invention;

DETAILED DESCRIPTION

Figure 1:
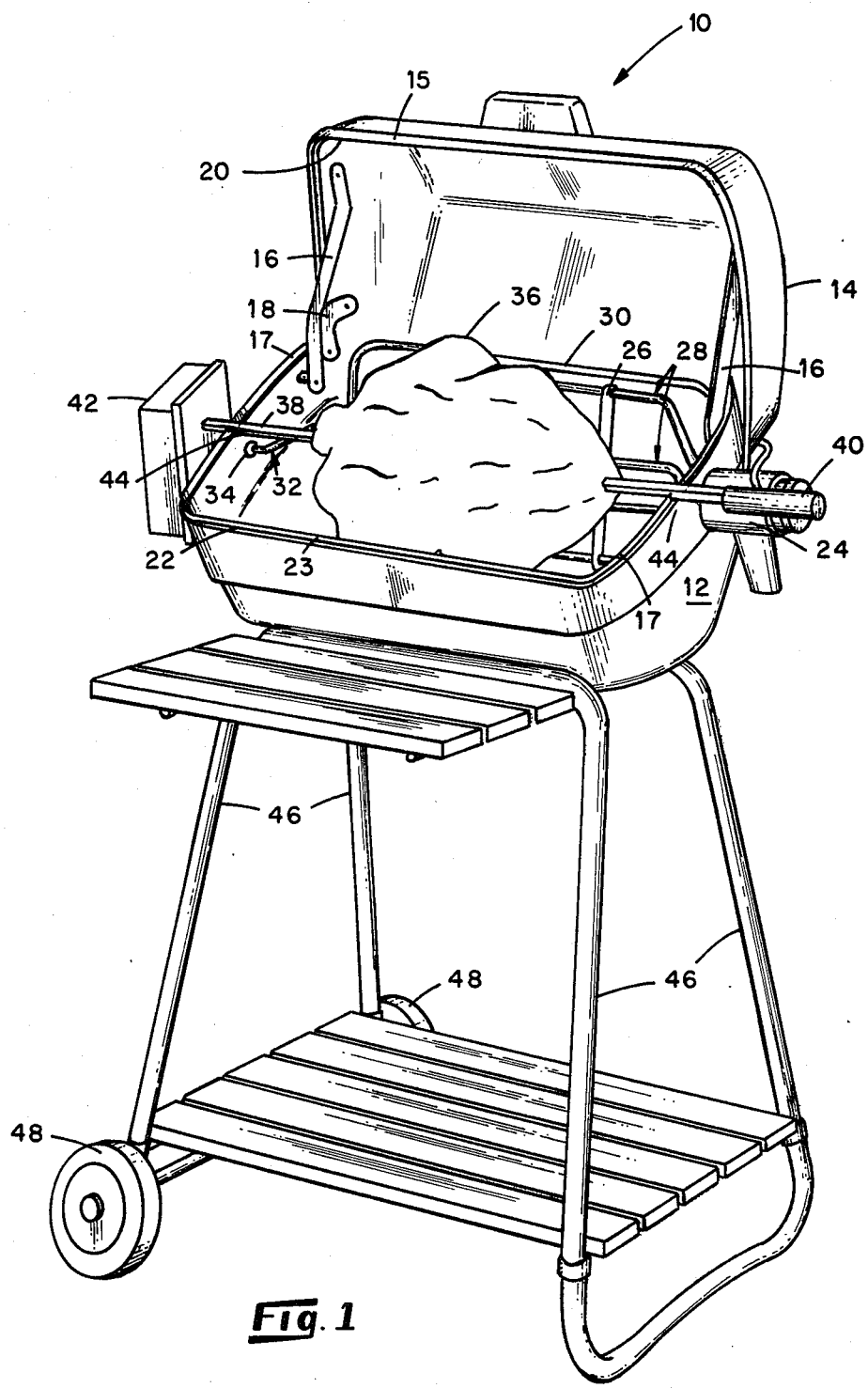
FIG. 1 is a perspective view of a barbeque grill or cooker embodying one form of the present invention.

Referring now to the drawings in which like reference characters designate like or corresponding parts throughout the several views, there is shown in FIG. 1 a grill 10 embodying one form of the present invention. The grill 10 includes a lower grill bowl 12 with a lid 14 dimensioned to fit over the bowl. The lid 14 is secured to the bowl 12 by interacting hinge arms 16 and 18 that are pivotally secured on one end to the lid 14 and on the other end to the bowl 12. In FIG. 1, the lid 14 is shown in a fully opened position. When the lid 14 is rotated forward, hinge arm 16 causes the front edge 15 of the lid 14 to rotate forwardly and downwardly toward the bowl 12, and hinge arm 18 causes the rear edge of the lid 14 to rotate first upwardly and then downwardly in an arc so that the lid 14 is secured over the bowl 12. A lip 20 is formed around the periphery of the lid 14 with dimensions sufficient to fit over a flange 22 that is formed along the peripheral edge of the bowl 12.

The opening of the bowl 12 is defined by the flange 22 and in its depth dimension it is angled at approximately 30° with respect to horizontal to form two inclined side edges 17. Similarly, when the lid 14 is closed, the lip 20 of the lid will be inclined at an angle of about 30° with respect to horizontal. This inclination angle provides a low front bowl edge 23 so that food is easily placed on and removed from the grill 10, and the rear portion of the bowl 12 in combination with the lid 14 provide a wind screen along the rear of the grill.

A control housing 24 is mounted on the right side of the grill bowl 12 and this housing is directly and fixedly connected to brackets 26 that are disposed within the grill 12. The housing 24 is rotatably mounted on the bowl 12 so that, as the housing 24 is rotated, the bracket 26 will rotate within the bowl 12. An electric heating element 28 is connected and supported by the bracket 26 and, likewise, a reflector 30 is fixedly mounted on the bracket 26. Thus, as the control housing 24 is rotated, the heating element 28 and the reflector 30 are rotated within the grill bowl 12.

The housing 24 is connected to the bracket 26 by means of an adjusting rod 32 that will be described in greater detail hereinafter. The adjusting rod 32 includes an annular flange 34 adjacent to its outermost end. In this construction, a nipple is formed on the end of the adjusting arm 32 and is inserted into a hole in the grill bowl 12 so that its outermost end is rotatably supported by the bowl 12. The other end of the adjusting rod 32 extends into and is secured within the housing 24.

In FIG. 1, the housing 24 is rotated to a position that places the heating element 28 and the reflecting pan 32 in a vertical position in the rear of the bowl 12. Because of the inclined shape of the bowl opening defined by flange 22, the rear of the bowl 12 is high enough to allow the heating element 28 and reflector 30 to be rotated to a vertical position without leaving the confines of the bowl 12. It is desirable to place the heating element 28 or reflector 30 in the vertical position when roasting meat such as the turkey 36, shown in FIG. 1. In this orientation, the oil and drippings from the turkey 36 will fall into the bottom of the bowl 12 which is not sufficiently hot to ignite the drippings. Thus, the drippings will not fall on either the heating element 28 or the reflector 30 and the likelihood of flare-up is to practically zero.

The turkey 36 is mounted on a rotisserie rod 38 that extends through the approximate center of the volume defined by the bowl 12 and lid 14, when closed. U-shaped channels 44 are formed in the inclined edges 17 of the bowl 12 about one-half of the distance up the edges 17, and the rod 38 is supported in the channels 44. The inclination angle of the bowl edges 17 provide the necessary elevation for placing the rotisserie rod 38 in the approximate center of the volume defined by the bowl 12 and lid 14.

The rotisserie rod 38 is driven by a drive unit 42 on one end of the rod 38, and a handle 40 is provided on the other end of the rod. The drive unit 42 is fixedly secured to the bowl 12 with appropriate fasteners such as bolts or sheet metal screws, and the other end of the rotisserie rod 38 is rotatably supported in the U-shaped channel 44.

The bowl 12 is supported by a tubular leg structure 46 and wheels 48. In this construction, the housing 24 may be used to raise one end of the grill so that it is supported on the wheels 48 and may be moved about.

For a better understanding of construction details, an assembly of the adjusting rod 32, the brackets 26, and the heating element 28 is shown in FIG. 2. In FIG. 2 the brackets 26 are in a horizontal position parallel with the face of the figure and the heating element 28 is formed in a pattern to provide four parallel segments 50, 52, 54 and 56 that are arranged in a coplanar configuration and are secured to the brackets 26.

The adjusting rod 32 is spot-welded to the brackets 26 and includes an outer end segment 58 that is inclined upwardly (out of the page) and toward the top of FIG. 2. The end segment 58 is inclined at an angle of 70° with respect to the horizontal plane defined by brackets 26. As previously described, an annular flange 34 is formed adjacent the outer end of the adjusting rod 32 and a nipple 60 extends from the other side of the flange 32. The nipple 60 fits into an aperture 62 formed in the bowl 12 and thereby rotatably mounts the outer end of the adjusting rod 32 in the bowl 12. The other end of the adjusting rod 32 includes an upwardly extending segment 64 that is parallel to segment 58. An interconnecting segment 66 extends from the top of segment 64 in a direction parallel to the main segment 68 of the adjusting rod 32, and an exterior segment 69 extends downwardly (into the page) and toward the front of the grill (toward the bottom of the page). When the heating element segments 50, 52, 54 and 56 are in a horizontal plane, the exterior segment 69 will be inclined at an angle of about 30° with respect to horizontal and will be parallel to the inclined edge of the bowl 12.

The two ends 70 and 72 of the electric heating element 28 extend through and are fastened to a bracket 74 and a bracket arm 76 extends outwardly from the bracket 74. A nipple 78 is formed on the arm 76 for the purpose of engaging detents in the bowl 12 as will hereinafter be described in greater detail. The interconnecting segment 66 of the adjusting rod 32 also extends through the bracket 74.

Referring now to FIG. 3, there is shown a side view of the heating element 28, brackets 26, and adjusting rod 32. By comparing FIGS. 2 and 3, the size and inclination angles of segments 58 and 68 of the adjusting rod 32 are more readily apparent. In FIG. 4, there is shown an end view of the assembly of FIGS. 2 and 3. In this view, it may be appreciated that each of the brackets 26 includes hooks 80 and 82 that are used to secure the reflector 30 thereon as will be hereinafter described in greater detail. Also, in FIG. 4, the heating element ends 70 and 72 and the adjusting rod 32 are shown extending through the bracket 74 with an aperture 84 disposed immediately above and centered with respect to the ends 70 and 72.

In FIG. 5 there is shown a heating element attachment bracket 86 which includes apertures 88 and 90 that are dimensioned to receive the ends 70 and 72 of the heating element. These heating element ends 70 and 72 are inserted through the apertures 88 and 90 and the bracket 86 is crimped to secure the heating elements therein. The bracket 86 also includes an aperture 92 that is spaced from the apertures 88 and 90 in the same manner as aperture 84 is spaced from the heating elements 70 and 72. In construction, the heating element ends 70 and 72 are inserted through apertures 88 and 90, the bracket 86 is crimped, and the ends 70 and 72 are inserted through bracket 74. Thus, the attachment bracket 86 is disposed immediately behind the bracket 74 as shown in FIG. 4, and the apertures 84 and 92 are aligned. A sheet metal screw is then threadably secured through apertures 84 and 92 to secure together the brackets 74 and 86.

Figure 6:
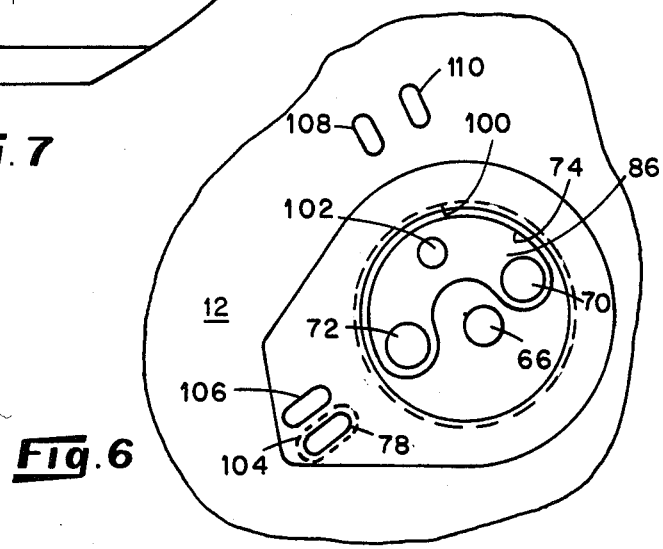
FIG. 6 is a detail view of a bracket, nipple and detent system used to secure the heating element in various cooking positions.

Referring now to FIG. 6, there is shown a somewhat diagrammatical inside view of the bowl 12 showing the bracket 74. In this view, it may be appreciated that the bowl 12 has an aperture 100 dimensioned to receive and rotatably mount the bracket 74 in the bowl 12. Referring to FIGS. 6 and 2, it will be appreciated that the bracket 74 will rotate in conjunction with the heating element 28 and the adjusting rod 32. In FIG. 6, the heating element ends 70 and 72 and the interconnecting section 66 of the adjusting rod 32 are shown going through the bracket 74. The attachment bracket 86 is shown securing the heating elements 70 and 72 to the bracket 74 by means of a screw 102.

As the heating element 28 and the adjusting rod 32 rotate, the attachment bracket 74 moves the nipple 78 in an arc, and detents 104, 106, 108 and 110 are formed in the bowl 12 to catch and resiliently hold the nipple 78 and bracket 74 in one of four selected positions. When the nipple 78 is in the detent 104, the heating element 24 is horizontal. When the nipple 78 is in detent 106, the heating element is positioned at an angle of approximately 10° with respect to horizontal. When the nipple 78 is disposed in the detent 108, the heating element has been rotated approximately 85°, and is about vertical. With the nipple 78 in the detent 110, the heating element is inclined at an angle of about 20° with respect to vertical and is facing downwardly; that is, the heat is radiated downwardly at an angle of about 20° with respect to horizontal.

Figure 7:
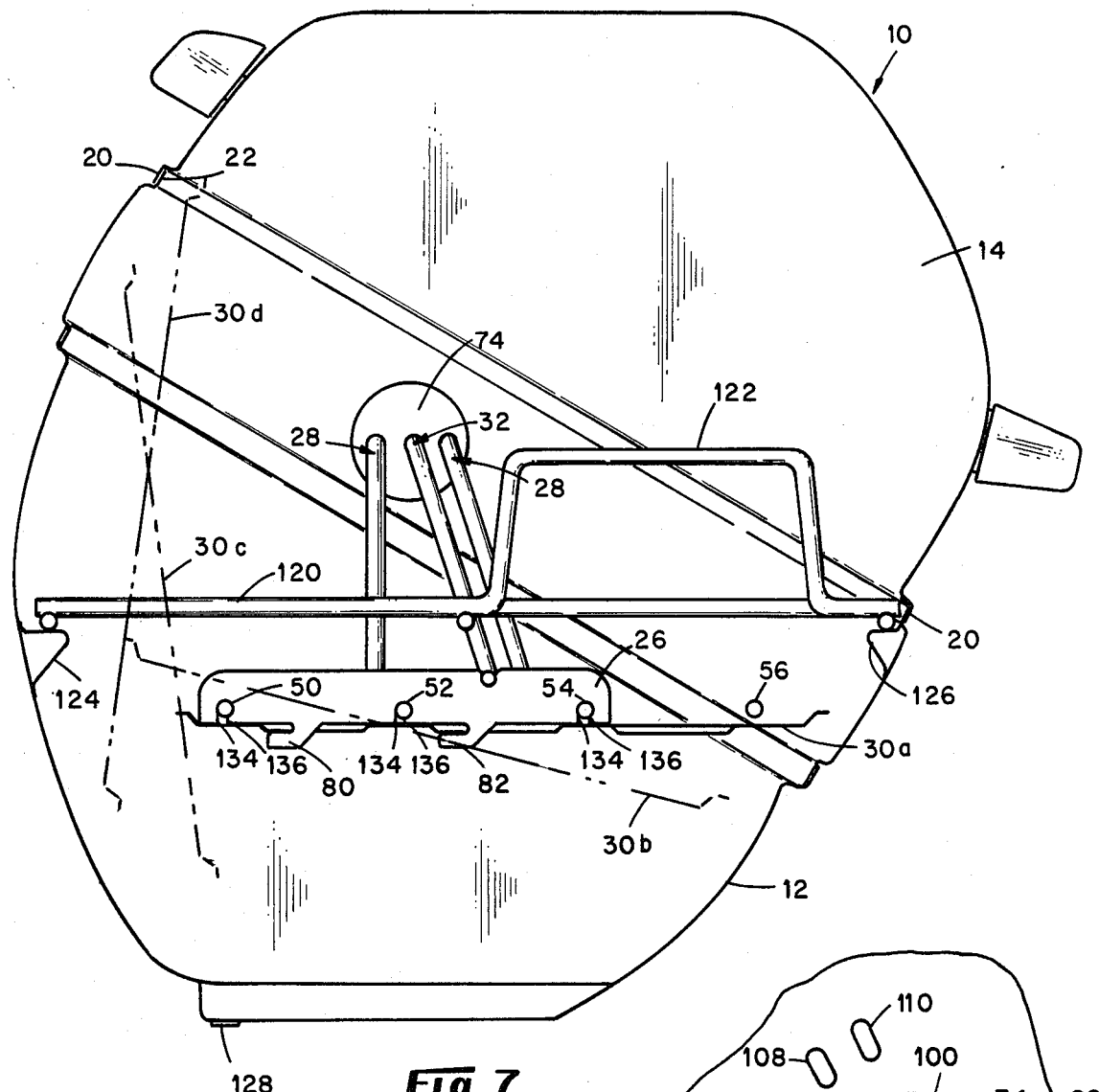
FIG. 7 is a somewhat diagrammatical cross-sectional view of the cooker 10 showing the various positions that the heating element and reflector may assume.

In FIG. 7, there is shown a somewhat diagrammatical cross-sectional view of the grill 10 depicting the various positions that the heating element 28 and reflector 30 may assume. In this view, the heating element segments 50, 52, 54 and 56, and reflector 30 are shown in a horizontal position and a cooking grid 120 is mounted in a horizontal position above the heating element segments 50, 52, 54 and 56. This grid 120 includes handles 122 to assist in removing the grid from the grill 10. The grid 120 rests upon rear supports 124 mounted on the rear wall of the bowl 12 and forward supports 126 that are mounted on the forward wall of the bowl 12. As described above with respect to FIG. 6, the heating element 28 and the adjusting rod 32 may be rotated to four different positions, and referring to FIGS. 6 and 7, the reflector 30 assumes a horizontal position as indicated by numeral 30a when the nipple 78 is disposed in the detent 104. When the nipple 78 is inserted into the detent 106, the reflector 30 assumes the position as indicated by the numeral 30b and, of course, the brackets 26 and the segments 50, 52, 54 and 56 would move with the reflector and assume a position corresponding to that shown by reflector 30b. When the nipple 78 is rotated and inserted into the detent 108, as shown in FIG. 6, numeral 30c in FIG. 7 indicates the position of the reflector 30, and when the nipple 78 is inserted into the detent 110, the reflector 30 assumes the position indicated by the numeral 30d. As indicated previously, the bracket 26, the heating element 28 and the adjusting rod 32 will also rotate with reflector 30 to vertical positions corresponding to the positions indicated by numerals 30c and 30d.

When the heating element 28 is rotated to the position indicated by the reflector 30b, it will be appreciated that the heating element 28 is inclined with respect to the cooking grid 120. The rear heating element segment 50 will be nearest to the grid 120 and the front heating element segment 56 will be furthest from the grid 120. In this orientation, the user may place meat on the grid 120 according to the degree of doneness desired. For example, the well done steaks would be placed on the rear portion of the grid 120 and the more rare steaks would be placed on the front portion of the grid 120.

In order to rotate the reflector to the positions indicated by numerals 30c and 30d, the grid 120 must be removed and, usually, a rotisserie rod 38, such as shown in FIG. 1, is used. The advantage of rotating the reflector 30 to the positions indicated by the numerals 30c and 30d is that heat is transmitted to the meat from its side. Therefore, drippings from the meat will fall on the relatively cool bottom of the bowl 12 and the possibility of flare-ups is minimized. The grease in the bottom of the bowl 12 may be drained through a grease drain 128. Also, when the reflector 30 is rotated to the position indicated by numeral 30d, the reflector 30 is in a position for easy removal from the grill 10. The reflector 30 is supported on the support bracket 26 by the rearwardly facing hooks 80 and 82 and apertures 132 are formed in the reflector 30 and are dimensioned to receive the hooks 80 and 82. In this configuration, the reflector 30 is held by a friction fit on the hooks 80 and 82. When the heating element 28 and the reflector 30 is rotated to the position indicated by the numeral 30d, the rearwardly facing hooks 80 and 82 are now upwardly facing and the upper edge of reflector 30 is clear of the edge of bowl 12. Thus, by gripping the top edge of the reflector 30 and pulling upwardly, the reflector 30 may be removed from the hooks 80 and 82 and removed from the bowl 12. The reflector 30 is likewise easy to remount on the hooks 80 and 82 by rotating the bracket 26 to the position that would place the reflector in the substantially vertical position indicated by numeral 30d.

The heating element segments 50, 52 and 54 are secured on the support bracket 26 in key-hole shaped channels 134. In order to insert the heating elements 50, 52 and 54 into the channels 134, flanges 136 are bent perpendicularly to allow sufficient room to insert the heating element. Once the elements 50, 52 and 54 are inserted, the flanges 136 are bent back to the position shown in FIG. 7 and they secure the heating elements 50, 52 and 54 within the key-hole shaped channels 134.

The reflector 30 is shown in detail in FIGS. 8 and 9, and referring to those figures, it is shown that the reflector 30 includes a raised rim 140 extending about the perimeter of the reflector 30 and a substantially flat bottom 142. Forty-five drain holes 144 are formed in the bottom 142 of the reflector 30 and each drain hole is formed in a circular recess 146. The holes 144 are arranged in four rows 148, 150, 152 and 154 and the heating element segments 50, 52, 54 and 56 as shown in FIG. 2 are positioned directly over the rows 148, 150, 152 and 154.

Interposed between the rows 148, 150, 152 and 154 are oval shaped raised reflector islands 156 that include upwardly inclined shoulders 158 and planar tops 160 which are parallel to the reflector bottom 142. The reflector islands 156 are also positioned in rows 162, 164 and 166 between the rows 148, 150, 152 and 154 of holes 144. Thus, the islands 156 are disposed laterally to the sides of the heating element segments 50, 52, 54 and 56 so that the inclined shoulders 158 tend to reflect heat from the heating element 28 in a direction away from the bottom 144 of the reflector 30, preferably, at an obtuse angle with respect to the plane of the bottom 142.

Slot-shaped apertures 132 are formed in recesses 168 in the bottom 142 of the reflector 30. As best shown in FIG. 7, each of these apertures 132 has been dimensioned to receive the hooks 80 and 82 the bracket 26. It should be noted that the apertures 132 are arranged in rows of three each, but that only two apertures 132 in each row are used at any one time to engage the hooks 80 and 82. This construction is used to provide a symmetrical reflector 30 that will fit on the bracket 26 regardless of which lateral side is oriented to the front. That is, the reflector 30 may be rotated 180° in the horizontal plane of its bottom 142 and it will still fit on the bracket 26, as shown in FIG. 7.

Figure 10:
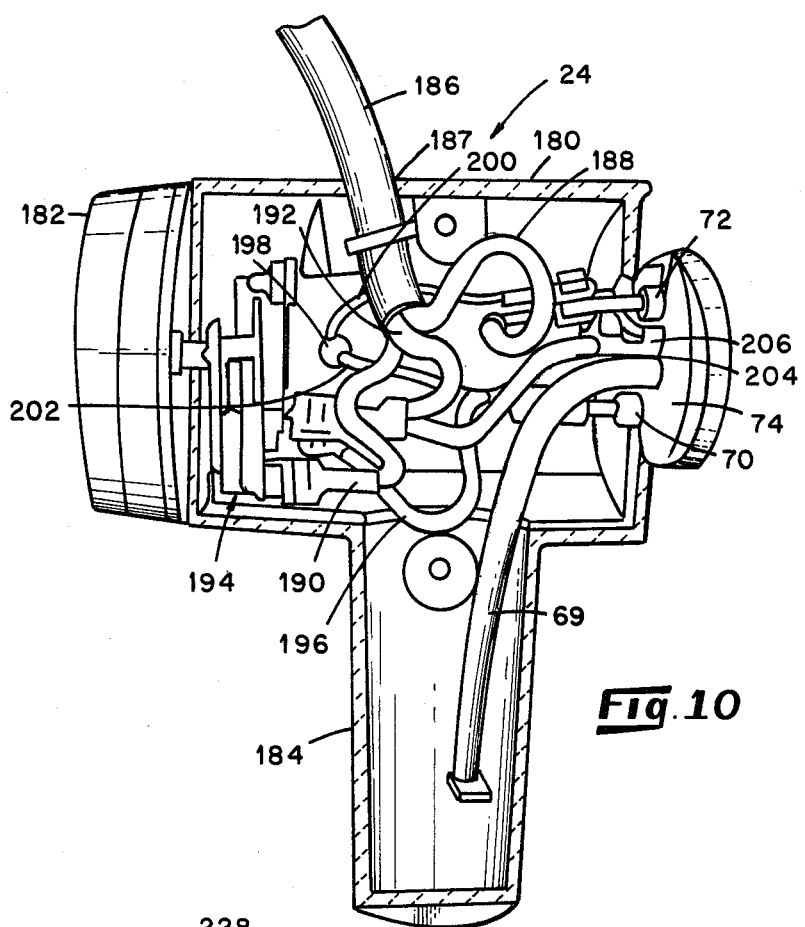
FIG. 10 is a somewhat diagrammatical view of the electrical main housing showing wiring connections between the thermostat and the heating element.

Referring to FIG. 10, in conjunction with FIGS. 1 and 2, the electrical control system for the heating element 28 may be described. The electrical connections to the heating element 28 are provided within the housing 24 which includes a cylindrical main housing 180, a control knob 182 and a handle 184. A power cord 186 enters the housing through an appropriate aperture 187 and is connected to the heating element 28 within the housing. The power cord 186 includes two hot (current carrying) wires 188 and 190 and a ground wire 192. The wire 188 is connected directly to one heating element end 72 and the other hot wire 190 is connected to a thermostat 194 located in the rear of the housing 180. The thermostat is controlled by rotating the knob 182 and it operates to switch the power "on" and "off" to the heating element 28, as will be hereinafter described in greater detail. The output from the thermostat 194 is carried by wire 196 to the other heating element end 70. A light 198 is mounted in the housing and is connected by wires 200 and 202 to the two heating element ends 72 and 70. Thus, the light 198 will simply indicate whether the heating element 28 is "on" or "off." The ground wire 192 is connected to the thermostat 194 and is also connected by wire 204 to a connector 206 that provides a ground to the outer sheath of the heating elements 70 and 72.

The heating element ends 70 and 72 are disposed partially within the main housing 180 and, thus, will heat the interior of the housing 24. The thermostat 194 detects the ambient heat within the housing 24 and switches the current to the heating element 28 depending upon the ambient heat within the housing 24 and according to the position of control knob 182.

Also, the end segment 69 of the adjusting rod 32 is enclosed within the handle 184. Referring to FIGS. 10 and 1, it will be appreciated that the position of heating element 28 and the reflector 30 may be varied by rotating the housing 24. Preferably, this rotational force is applied through the handle 184. With the segment 69 disposed within the handle 184, a direct force is applied through the handle 184 to segment 69 in order to rotate the adjusting rod 32. By placing the segment 69 within the handle 184, little or no stress is applied to the housing 24 when the adjusting rod 32 is rotated to change the position of the heating element 28 and the reflector 30.

Figure 12:
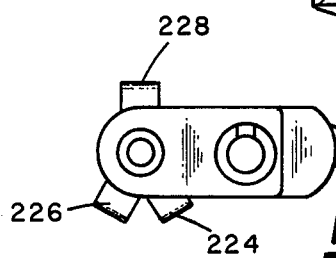
FIGS. 11, 12 and 13 are, respectively, a side view, a top view and an end view of the thermostat.
Figure 11:
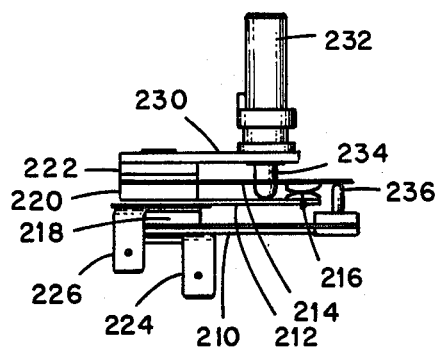
Figure 13:
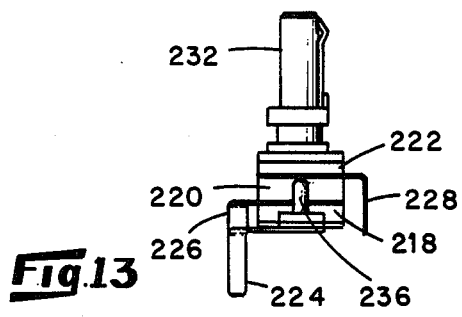

FIGS. 11, 12 and 13 show further detailed views of the thermostat 194 that is used in the main housing 180. FIG. 11 is a side view of the thermostat 194, while FIG. 12 is a top view and FIG. 13 is an end view. Referring to FIGS. 11, 12 and 13, there is shown a bimetal strip 210 that is configured to bend upwardly (referring to FIG. 11) in response to heat. Mounted in a parallel relationship with the bimetal strip 210 are a pair of metal strips 212 and 214 with contacts 216 providing an electrical contact between strips 212 and 214. The bimetal strip 210 and the metal strips 212 and 214 are mounted on insulators 218, 220 and 222 in a spaced apart relationship insulated one from the other, and a nipple 236 is mounted on the bimetal strip 210 for operating against strip 214. An electrical spade fitting 224 is connected to the bimetal strip 210 and, as shown in FIG. 10, it is connected to ground, and electrical spade fittings 226 and 228 are connected to metal strips 212 and 214, respectively. One of the fittings 226 or 228 is connected to the power source by wire 190, as shown in FIG. 10, and the other of said fittings is connected to the heating element 28 through wire 196 (FIG. 10).

Mounted to the top of insulator 222 is a support bracket 230 for a control knob 232. By a threaded connection, the knob 232 is connected to drive a plunger 234 in an axial direction both toward and away from the metal strip 212. Referring to FIG. 11, the metal strip 212 is biased in an upward direction and its upward motion is resisted by a plunger 234. As best shown in FIGS. 12 and 13, the plunger 234 extends through an aperture in the metal strip 214. When the ambient temperature within the main housing 180 rises, the bimetal strip 210 bends upwardly and forces the nipple 236 upwardly against the metal strip 214. As the nipple 236 forces the metal strip 214 upwardly, the spring bias of the metal strip 212 will cause the strip 212 to follow strip 214, but the plunger 234 will limit the motion of strip 212. When strip 212 engages plunger 234 and the temperature increases, nipple 236 will force strip 214 upwardly and the contacts 216 will break apart thereby turning off the heating element 28. When the ambient temperature within the housing 280 begins to fall, the bimetal strip 210 will begin to relax and the nipple 216 will begin a downward motion until the contacts 216 will close together and again supply power to the electrical heating element 28. By rotating the knob 232, the vertical position of the plunger 234 is controlled, thereby, controlling the vertical position of strip 212. Thus, using the knob 232, one may control the temperature at which the contacts 216 will be broken apart. By moving the plunger 234 to its lowermost position, the lowest heating temperature is selected and by moving the plunger 234 to its uppermost position, the highest temperature setting is chosen.

Having thus described the preferred embodiment of the present invention, it should be appreciated that the numerous advantages are provided by the invention arising, primarily, from the structure associated with the rotating heating element 28. The primary advantage of the rotating heating element 28 is best shown in FIG. 1 in which a turkey 36 is heated from the side by the vertical heating element 28. In this position, the heating element 28 effectively radiates heat toward the turkey 36, but the drippings will not fall on the heating element. As best shown in FIG. 7, the rotating heating elements 28 enables the user to provide hot and cool spots on a cooking grid 120 by canting the heating element and the reflector 30 to the position indicated by numeral 30b in FIG. 7. In this canted position, the heating element 28 will provide greater heat to the rear of the cooking grid 20 than to the forward portion thereof.

Yet another advantage of the rotating heating element and reflector is the easy removal of the reflector 30 when it is in the position indicated by numeral 33. Referring to FIGS. 1 and 7, it will be appreciated that the bowl 12 and lid 14 of the grill 10 provide an uniquely shaped volume that is designed to maximize the utility of the grill 10 for purposes of rotisserie cooking and grill cooking. It is first noted that the bowl 12 is enlarged toward the rear or the grill 10 (the left side of FIG. 7) and that the lid 14 provides an increased volume or bulge on the forward side of the grill 10 (the right side of FIG. 7). In this construction, it appears that the grill 10 leans forward (to the left in FIG. 7). The shape of the bowl 12 allows a rotation of the heating element 28 and reflector 30 to the positions indicated by numerals 30c and 30d. The combined shape of the bowl 12 and the lid 14 places the rotisserie rod 38 in the center of the usable volume within the bowl 12 and lid 14 when the heating element 28 and reflector 30 are in the position indicated by numeral 30c in FIG. 7. Thus, the bowl 12 and lid 14 are in a configuration designed to allow rotation of the heating element 28 and reflector 30 and, yet, to maximize the rotisserie cooking space. Again, referring to FIGS. 7 and 1, it will be appreciated that the inclined lateral edges 17 on the bowl 12 aid in maximizing the rotisserie cooking space and, when the cooking grid 120 is used, the lower front edge 23 of the bowl 12 provides easy access to the food on grid 120.

Referring to FIGS. 2, 3, 4 and 10, the advantages offered by the construction of adjusting rod 32 and housing 24 may be best appreciated. By enclosing segment 69 of the adjusting rod 32 within the handle 184 of the housing 24, rotational forces may be applied to the adjusting rod 32 and, hence, to the brackets 26, heating element 28, and reflector 30 without placing substantial stress on the main housing 180. Also, by incorporating the electrical connections to the heating element 28 and to the housing 24, there is no need for any type of sliding or bending connectors to allow rotational movement of the heating element 28. In effect, the entire electrical system including the thermostat 194, is rotated with the heating element. Only the power cord 186 is required to flex in order to allow this rotational movement. Thus, the combination of the electrical housing 24 and the interconnected heating element 28 and adjusting rod 204 provides for an inexpensive, durable and reliable mechanism for adjusting the rotational position of the heating element 28 and reflector 30. Thus, in the construction described above, the grill 10 is versatile in that it is efficiently used as a rotisserie cooker or as a grill and, yet, because of its efficient design it is relatively inexpensive to build.

Although a particular embodiment has been described above, it is to be understood that the invention is capable of numerous rearrangements, modifications and substitutions of parts without departing from the scope of the invention as set forth in the appended claims.

What is claimed is:

1. An electric barbeque cooker comprising:
   a cooker bowl;
   means for supporting food in said bowl for being cooked;
   an electric heating unit dimensioned to fit within said bowl for cooking the food;
   means for supplying electric power to said electric heating unit;
   means for mounting said heating unit within said bowl for movement between a substantially horizontal position and a non-horizontal;
   said bowl being dimensioned to contain said heating element within the volume of said bowl when said heating element is in either said horizontal or said non-horizontal position;
   actuation means connected to said heating unit for moving said heating unit between the horizontal position and the non-horizontal position;
   catch means for holding said heating unit in the horizontal position and in the non-horizontal position; and
   said mounting means being configured together with said heating unit so that movement of said heating unit between the horizontal and the non-horizontal positions may be accomplished while food is supported in said bowl by said support means.

2. The cooker of claim 1 wherein:
   said means for mounting is operable to support said heating unit in a substantially horizontal position and in a substantially vertical position; or
   said bowl is dimensioned to substantially contain within its volume the heating element in both the horizontal position or the vertical position.

3. The cooker of claim 1 wherein said acutation means comprises:
   a handle movably mounted on the exterior of said bowl; and
   a mechanical interconnection between said handle and said heating unit operable to move said heating unit between the horizontal position and the non-horizontal position in response to movement of said handle.

4. The cooker of claim 1 wherein said means for supplying electric power comprises:

a housing defining an enclosed space mounted on the exterior of said bowl and enclosing a portion of said heating unit within said housing so that said heating unit is operable to heat the enclosed space of said housing;

a power cord for supplying power to the enclosed space within said housing;

a thermostat mounted within said housing and electrically connected to said heating unit and said power cord for switching the power "on" and "off" to the heating unit in response to the temperature within the enclosed space of said housing;

means for adjusting the temperature at which said thermostat switches "on" and "off";

a knob mounted on the exterior of said housing and being mechanically interconnected with said means for adjusting for enabling a user to manipulate said means for adjusting to vary the temperature at which said thermostat turns "off" and "on".

5. An electric barbeque cooker comprising:

a bowl having a front, a rear, two lateral sides, and a bottom;

means for supporting food for being cooked within said bowl;

an electric heating element dimensioned to fit within said bowl for cooking the food supported in said bowl;

means for supplying electric power to said heating element;

means for rotatably mounting said heating element within said bowl for rotational movement between a substantially horizontal position and a substantially vertical position adjacent the rear side of said bowl;

catch means for holding said heating element in the substantially horizontal position or the substantially vertical position;

said bowl being dimensioned with a rear side of sufficient height to substantially contain said heating element within its volume when said heating element is in the substantially vertical position;

a mechanical linkage connected between said means for rotatably mounting and the exterior of said bowl;

handle means connected to said mechanical linkage and pivotally mounted on said housing for imparting a rotational force to said mechanical linkage to rotate said heating element between the substantially horizontal position and the substantially vertical position; and said heating element being configured together with said means for rotatably mounting so that said heating element moves between said substantially horizontal position and said substantially vertical position while food is supported in said bowl.

6. An electric barbeque cooker comprising:

a bowl having a front, a rear, two lateral sides, and a bottom;

an electric heating element dimensioned to fit inside said bowl for cooking food;

means for supplying electric power to said heating element;

means for rotatably mounting said heating element within said bowl for rotational movement between a substantially horizontal position and a substantially vertical position adjacent the rear side of said bowl;

a mechanical linkage connected between said means for rotatably mounting and the exterior of said bowl;

catch means for holding said heating element in the horizontal position or the substantially vertical position;

said bowl being dimensioned with a rear side of sufficient height to substantially contain said heating element within its volume when said heating element is in the vertical position;

a handle connected to said mechanical linkage and pivotally mounted on said housing for imparting a rotational force to said mechanical linkage to rotate said heating element between the horizontal position and the substantially vertical position; and said means for rotatably mounting and said mechanical linkage comprising an adjustment rod having:

an outer segment mounted in said handle;

an interconnecting segment extending from said handle at about a right angle thereto and through a side of said bowl;

an interior segment extending from said interconnecting segment at about a right angle and extending along one side of said bowl;

a main segment extending from said interior segment and extending from one side of said bowl to an opposed side of said bowl;

an end segment extending from said main segment along and adjacent to said opposed side in a direction substantially parallel to said interior segment;

means for rotatably mounting the end of said end segment to said bowl whereby said main segment of said adjusing rod may be moved from a position proximate to the bottom of said bowl to a position proximate a side of said bowl by pivoting said handle; and means for mounting said heating element to said main segment of said adjusting rod.

7. The cooker of claim 6 wherein said means for mounting said heating element to said main segment comprises a support bracket mounted on said main segment and attached to said heating element.

8. The cooker of claim 7 further comprising:

a plurality of hooks formed on said support bracket adjacent to said heating element; and a reflector having apertures formed therein for receiving said hooks and being dimensioned to provide a friction fit mounting between said hooks and said reflector apertures for mounting said reflector on said support bracket adjacent said heating element.

9. The cooker of claim 5 when said bowl has an inclined opening defined by said front, rear and lateral sides, said front side being shorter in height than said rear side and said lateral sides having inclined edges extending between the tops of said front and rear sides.

10. The cooker of claim 9 further comprising a lid hingedly attached to said rear side of said bowl and dimensioned to fit closely over said inclined opening, said lid having an enlarged front portion relative to its rear portion for being disposed adjacent to said front side of said bowl when said lid is closed to provide an enlarged volume generally over said front side of said bowl to compensate for its shorter height relative to said rear side of said bowl.

11. The cooker of claim 9 further comprising a rotisserie rod mounted between said lateral sides and being supported on said bowl adjacent to said inclined upper edges of said lateral sides.

12. An electric barbeque comprising:
a bowl having a front, a rear, two lateral sides, and a bottom;
an electric heating element dimensioned to fit within said bowl for cooking food;
means for supplying electric power to said heating element;
means for rotatably mounting said heating element within said bowl for rotational movement between a horizontal position and a substantially vertical position adjacent the rear side of said bowl;
catch means for holding said heating element in the horizontal position or the substantially vertical position;
said bowl being dimensioned with a rear side of sufficient height to substantially contain said heating element within its volume when said heating element is in the vertical position;
a mechanical linkage connected between said means for rotatably mounting and the exterior of said bowl;
a handle connected to said mechanical linkage and pivotally mounted on said housing for imparting a rotational force to said mechanical linkage to rotate said heating element between the horizontal position and the substantially vertical position;
said means for supplying electrical power and said handle comprising:
a power cord;
an electrically insulating main housing;
an aperture formed in said main housing for receiving said power cord therethrough; means for rotatably mounting said housing on one side of said bowl;
a housing handle extendng from said housing in a direction generally parallel to the side of said bowl on which said main housing is mounted;
said mechanical linkage being connected to and extending with said housing handle;
a thermostat mounted within said housing, being connected between said power cord and said heating and being operable to switch the power "on" and "off" to said heating element;
a portion of said heating element being enclosed within said main housing to heat the interior space of said main housing; and
said thermostat being responsive to the temperature of the interior space of said main housing to switch power "on" and "off" to said heating element.

13. An electrical barbeque cooker comprising:
a bowl having a front side, a rear side and two lateral sides and a bottom;
a housing rotatably mounted on the exterior of a lateral side of said bowl;
a housing handle extending from said housing in a direction generally parallel to said lateral sides of said bowl;
an adjusting rod disposed in part within said housing and extending between said two lateral sides, said adjusting rod being rotatably mounted on the lateral side across said bowl from said housing and being configured with a main segment extending across said bowl and being movable from a position adjacent said bottom of said bowl to at least one other position;
a bracket mounted on said main segment of said adjusting rod;
an electrical heating element mounted on said bracket;
means for supplying electrical power to said electrical heating element;
a reflector mounted on said bracket adjacent to said heating element;
a catch mechanism operable to hold said adjusting rod in an least two positions whereby said adjusting rod, bracket, heating element and reflector may be moved between and held in at least two cooking positions.

14. The cooker of claim 13 wherein said catch mechanism comprises a nipple and detent catch mechanism having a nipple that is mechanically connected to said adjusting rod and having at least two detents formed in said housing for receiving said nipple.

15. The cooker of claim 13 further comprising a rotisserie rod mounted on the upper edges of said lateral sides.

16. The cooker of claim 13 further comprising a cooking grid and grid support pads mounted on the interior of said bowl for supporting said cooking grid in a horizontal position within said bowl.

17. The cooker of claim 16 wherein said heating element is movable between a horizontal position and an inclined position beneath said cooking grid.

18. The cooker of claim 13 wherein said heating element is movable between a horizontal positin adjacent to said bottom of said bowl and a substantially vertical position adjacent to said rear side of said bowl.

19. The cooker of claim 13 further comprising:
hooks formed on said support bracket beneath said heating element when in the horizontal position;
apertures formed in said reflector dimensioned to receive said hooks for mounting said reflector on said support brackets;
said hooks being oriented and configured to release said reflector when said reflector is rotated to a vertical position and is forced upwardly.

20. An electirc barbeque cooker, comprising:
a cooker bowl having an interior surface and an exterior surface, said bowl being configured to define a cooking space therein adjacent said interior surface within which food to be cooked may be disposed;
means for supporting food to be cooked in said cooking space of said bowl;
an electric heating unit configured to fit within said bowl for cooking the food supported in said cooking space;
means for mounting said heating unit within said bowl for movement between a substantially horizontal position and a non-horizontal position;
said bowl being configured to contain said heating unit within the volume of said bowl when said heating unit is in either said horizontal or said non-horizontal position;
actuation means disposed adjacent the exterior surface of said bowl and connected to said heating unit for moving said heating unit between the substantially horizontal position and the non-horizontal position; and
said mounting means being configured together with said heating unit so that said heating unit remains outside of said cooking space during its movement between said horizontal and non-horizontal positions, whereby movement of said heating unit between said horizontal and non-horizontal positions may be accomplished while food is supported in said cooking space.

21. The cooker of claim 20, wherein said mounting means is configured to move said heating unit to at least one position intermediate said substantially horizontal and nonhorizontal positions.

22. The cooker of claim 20, wherein said mounting means and heating unit are configured so that said heating unit is disposed between said interior surface and said cooking space of said bowl and faces the food supported in said cooking space during its movement between said substantially horizontal and non-horizontal positions, and when disposed in said substantially horizontal and non-horizontal positions.

23. The cooker of claim 22, wherein said mounting means is configured to dispose said heating unit in spaced-apart relation to the approximate center of said cooking space and to effect a rotation of said heating unit about an axis that is positioned at the approximate center of said cooking space as said heating unit is moved between said horizontal end and non-horizontal positions.

* * * * *

UNITED STATES PATENT AND TRADEMARK OFFICE
CERTIFICATE OF CORRECTION

PATENT NO. : 4,663,517

DATED : May 5, 1987

INVENTOR(S) : George L. Huff and Emmett R. Bales

It is certified that error appears in the above-identified patent and that said Letters Patent is hereby corrected as shown below:

In the abstract, line 6, "heat" should be -- heating --.

Column 10, line 54, "and" should be -- or --.

Column 10, line 54, "or" should be -- and --.

Column 13, line 3, after "barbeque" insert -- cooker --.

Column 13, line 37, "extendng" should be -- extending --.

Column 14, line 42, "electirc" should be -- electric --.

Signed and Sealed this

Eighteenth Day of August, 1987

Attest:

DONALD J. QUIGG

*Attesting Officer*    *Commissioner of Patents and Trademarks*